(12) United States Patent
Zhu et al.

(10) Patent No.: US 7,290,058 B2
(45) Date of Patent: Oct. 30, 2007

(54) VIDEO MAIL SERVER WITH REDUCED FRAME LOSS

(75) Inventors: Yuesheng Zhu, San Jose, CA (US); Shaun Yu, Hillington Green (SG); Chih-Ping Lee, Cupertino, CA (US)

(73) Assignee: Innomedia PTE, Singapore (SG)

( * ) Notice: Subject to any disclaimer, the term of this patent is extended or adjusted under 35 U.S.C. 154(b) by 838 days.

(21) Appl. No.: 10/627,593

(22) Filed: Jul. 26, 2003

(65) Prior Publication Data

US 2005/0021809 A1    Jan. 27, 2005

(51) Int. Cl.
G06F 15/16    (2006.01)
H04N 7/173    (2006.01)

(52) U.S. Cl. .............................. 709/231; 725/115
(58) Field of Classification Search .......... 709/231, 709/206; 725/115
See application file for complete search history.

(56) References Cited

U.S. PATENT DOCUMENTS

| | | | | |
|---|---|---|---|---|
| 5,912,697 | A * | 6/1999 | Hashimoto et al. | 725/114 |
| 6,499,060 | B1 * | 12/2002 | Wang et al. | 709/231 |
| 2001/0052019 | A1 * | 12/2001 | Walters et al. | 709/231 |
| 2002/0049852 | A1 * | 4/2002 | Lee et al. | 709/231 |
| 2002/0064149 | A1 * | 5/2002 | Elliott et al. | 370/352 |
| 2002/0154691 | A1 * | 10/2002 | Kost et al. | 375/240.01 |
| 2003/0002854 | A1 * | 1/2003 | Belknap et al. | 386/68 |
| 2003/0140159 | A1 * | 7/2003 | Campbell et al. | 709/231 |
| 2005/0038877 | A1 * | 2/2005 | Gupta et al. | 709/219 |

* cited by examiner

*Primary Examiner*—Jason Cardone
*Assistant Examiner*—Lin Liu
(74) *Attorney, Agent, or Firm*—Timothy P. O Hagan

(57) ABSTRACT

A video mail server comprises a video call signaling module coupled to an internet protocol network for establishing a first internet protocol channel with a caller remote internet video device to support a recording session over the internet protocol network and establishing a second internet protocol channel with a user remote internet video device to support a playback session over the internet protocol network. A media interface comprises a recording module for obtaining a recording sequence of compressed images representing motion video images from the caller remote internet video device and storing a video mail file representing the recording sequence of compressed images. Each compressed image frame is one of: i) an independent frame from which an image frame can be recovered utilizing only the independent frame; and ii) a dependent frame from which the image frame can only be recovered utilizing both the dependent frame and an independent frame preceding the dependent frame in the sequence. A play back module retrieves video mail file from the storage and transfers a playback sequence of compressed images to the user remote internet video device.

2 Claims, 8 Drawing Sheets

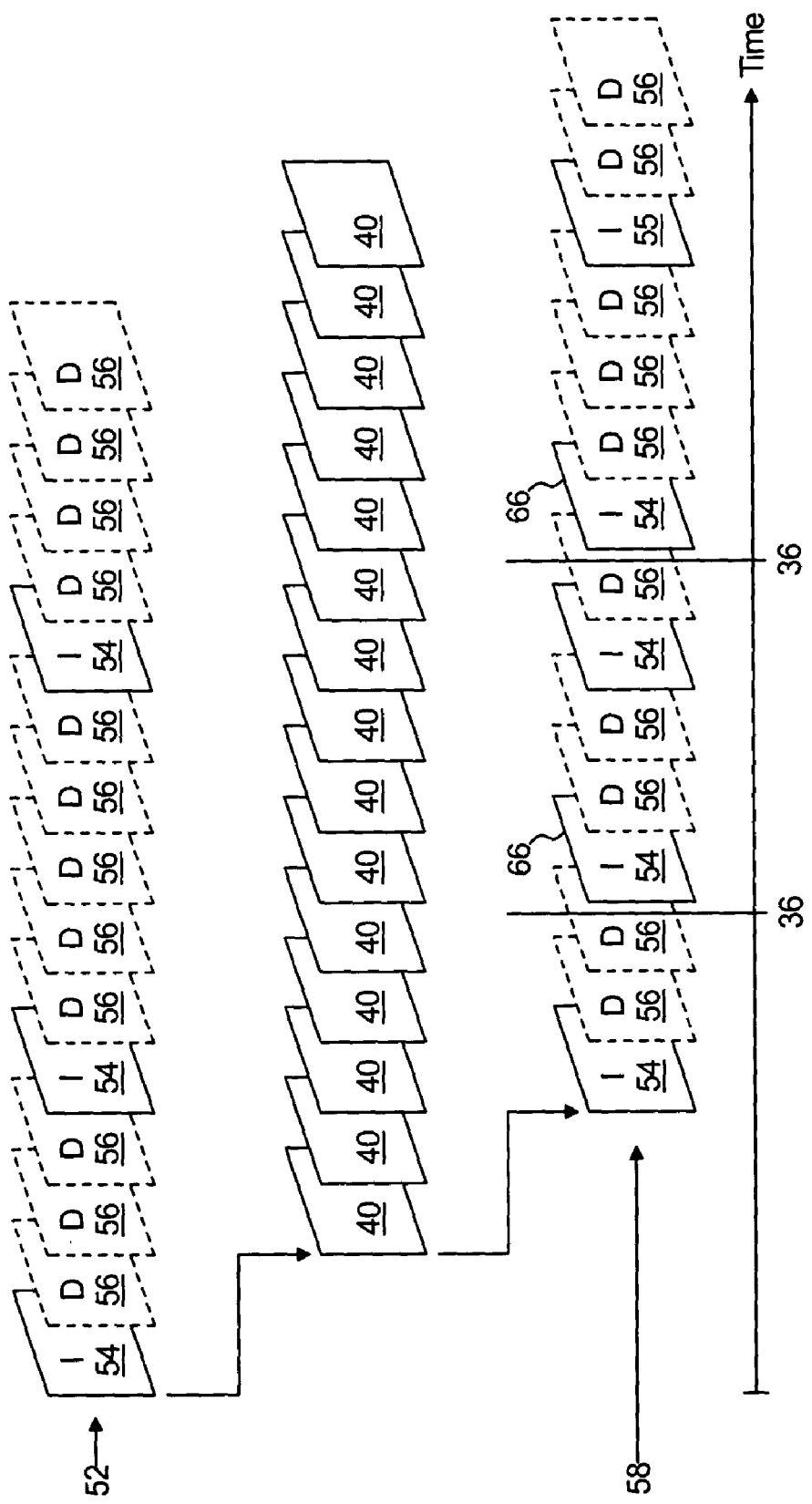

VIDEO MAIL SERVER WITH REDUCED FRAME LOSS

TECHNICAL FIELD

The present invention relates to video telephony, and in particular to a video mail server and methods for recording and playing back video mail messages.

BACKGROUND OF THE INVENTION

For quite some time telephone systems, including both private telephone systems, wireless telephone service provider systems, and PSTN service provider systems have included voice mail systems.

The voice mail functions of a telephone system are typically provided by a voice mail server. Upon the occurrence of certain events, such as a telephone line being busy or unanswered, the telephone system will signal the call (in a process typically referred to as roll-over" to the voice mail server. The voice mail server will receive the telephone call thereby opening a recording session.

During the recording session, the voice mail server will prompt the caller to leave a message, capture the audio stream from the caller, and store the captured audio stream for subsequent play back to the voice mail box owner. The recorded message is typically stored in digital form on magnetic media.

At some later point in time, the voice mail box owner may call the voice mail server to establish a play back session. During the play back session, the server will prompt the voice mail box owner to authenticate him or her self, retrieve the stored message, and generate an audio stream to the telephone system from which the voice mail box owner called into the server.

If the voice mail server is part of a circuit switched telephone system, both the recording session and the play back session will take place over circuit switched channels. During recording, the voice mail server will capture the analog audio or digital audio from the circuit switched channel. Digital audio can be stored in its received form and analog audio is readily digitized using known A/D converter systems.

It the voice mail server is part of a VoIP telephone system, both the recording session and the play back session will take place over IP channels. More specifically, when setting up the recording session, the server and the remote VoIP device (used by the caller) will negotiate a specific compression algorithm. Then, during the recording session, the voice mail server will receive a sequence of RTP packets over a UDP/IP channel. Each RTP packet includes one or more audio frames compressed using the negotiated compression algorithm. Each compressed audio frame represents a fixed time interval (on the order of 10 milliseconds) of digital audio. The server sequences and decompresses each compressed audio frame to regenerate digital audio for storage.

At a later time, when setting up the play back session, the server and the remote VoIP device (used by the voice mail box user) will negotiate a specific compression algorithm—which may be different than the compression algorithm used during the recording session. Then, during the play back session, the voice mail server will generate a sequence of RTP packets for sending to the remote VoIP device over a UDP/IP channel. Each RTP packet includes one or more audio frames compressed using the negotiated compression algorithm. The remote device sequences and decompresses each compressed audio frame to generate acoustic audio for the voice mail box user.

If the system is a hybrid type of system, it may support both: i) VoIP recording sessions and play back sessions; and ii) circuit switched recording and play back sessions. In such an embodiment, the session type of the recording session (e.g. VoIP or circuit switched) does not need to match the session type of the play back session.

In a separate field of development, technology for transmitting motion video over IP networks has been developed. During an IP video session, a transmitting video IP device will receive a sequence of image frames from a video camera, compress each image frame of the sequence, and transmit each compressed image frame to a receiving video IP device.

The receiving video IP device will decompress each compressed image frame of the sequence, and sequentially display each image frame of the sequence, to generate a motion video display.

The International Telecommunication Union (ITU) has recommended the H.263 standard entitled Video Coding for Low Bit Rate Communications as a standard for compression motion video for telephony. The existence of a standard facilitates the development of video IP devices.

There exist significant differences between transmitting motion video over an IP channel and transmitting audio over an IP channel. First, each compressed audio frame represents digital audio over a short duration of time. Each compressed video frame represents an image of the video stream at a fixed instant in time. Secondly, each audio frame is encapsulated in a single RTP packet and can be decompressed without reference to any other frames. The significance of this is that if an audio frame is lost in transmission, the audio for the duration of time represented by the lost frame is lost, but neither the preceding audio frame nor the following audio frame is affected.

On the other hand, sequential video frames are mostly interdependent. Each video frame is compressed into independent frames and dependent frames. The independent frames, referred to as "intra frames" or "i-frames", can be decompressed to generate a complete image frame without reference to a preceding frame or a following frame. The dependent frames can be of two types. The first type may be referred to as "predictive frames" or "p-frames". A p-frame represents the difference between such frame and the preceding p-frame or i-frame. As such, a p-frame can not be decompressed without reference to the preceding p-frame or i-frame. The second type may be referred to as "bi-directional frames" or "b-frames". A b-frame can only be decompressed with reference to one or more preceding i/p frames and optionally one or more following i/p frames.

The ratios between i-frames, p-frames, and b-frames is not fixed, but is dependent on encoding algorithms and dependent on the video image content—or scene. As such, the quantity of dependent frames between independent frames varies based on the video content. As such, the time duration between independent frames also varies based on video content.

A problem with interdependent frames is that if a frame is lost during transmission, all subsequent frames that depend thereon are also lost. The image on the receiving IP device will freeze until the next independent frame is received. Frame loss is further exacerbated by the fact that each image frame can be transmitted in multiple RTP packets. Loss of any RTP packet will cause the loss of the entire frame.

It has been proposed to combine video transmissions with voice mail server technology to provide video mail services. A problem exists in that implementing a video mail server causes the video message to be transmitted twice. The first transmission is from the caller to the video mail server. The second transmission is from the video mail server to a user "calling in" to retrieve video mail messages.

As such, frame loss exposure is doubled. Frames can be lost in the transmission from the caller to the voice mail server resulting in freeze frame periods stored on the voice mail server. When transmitted to the user, the freeze frame periods that already exist at the sever will be sent to the user and, in addition, further freeze frame periods will be created due to lost frames in the transmission to the end user.

As such, a need exists for a video mail solution that operates in conjunction with legacy video IP devices and does not suffer the disadvantages and impracticalities discussed above.

SUMMARY OF THE INVENTION

A first aspect of the present invention is to provide a video mail server. The video mail server comprises a video call signaling module coupled to an internet protocol (IP) network via an internet protocol services module.

The video call signaling modules: i) establishes a first internet protocol channel with a caller remote Internet video device (e.g. a caller system) to support a recording session over the IP network; and ii) establishes a second internet protocol channel with a user remote internet video device (e.g. a user system) to support a playback session over the IP network.

A media interface is also coupled to the IP network via the Internet protocol services module. The media interface comprises a recording module and a playback module.

The recording module obtains a recording sequence of compressed images, that represent motion video, from the caller system and stores a video mail file representing the recording sequence of compressed images.

The play back module retrieves the video mail file and transferring contents of the video mail file, as the playback sequence of compressed images, to the user system.

Each compressed image frame within the video mail file is one of: i) an independent frame from which a video image frame can be recovered utilizing only the independent frame; and ii) a dependent frame from which the video image frame can only be recovered utilizing both the dependent frame and an independent frame preceding the dependent frame in the sequence.

In one embodiment, the video mail server may further include a video codec coupled to the media interface. The video codec comprises a decoder module and an encoder module.

The decoder module receives the recording sequence of compressed images from the recording module and decodes the recording sequence of compressed images to generate motion video images. The encoder module then encodes the motion video images into the playback sequence of compressed images.

The playback sequence of compressed images may be in a robust format. The robust format requires that at least one independent frame be included within each fixed time duration. Further, the robust format may require that the duration of time between independent frames be a fixed period on the order of one second.

In one sub embodiment, the video codec operates during the recording session and the playback sequence of compressed images is transferred to the media interface for storing as the video mail file. In which case, the contents of the video mail file may be transferred directly to the user system during a play back session.

In a second sub embodiment, the decoder module operates gets the recording sequence of compressed images from the video mail file during the play back session. And, the playback sequence of compressed images is transferred directly to the user system.

As an alternative to encoding in a robust format, the video codec may operate during the playback session in a traditional manner. Except, during the playback session, the playback module may receive a lost frame message from the user system when the user system detects loss of a frame within the playback sequence of compressed images.

In response to receiving a lost frame message, the video codec may compress the next image frame of the motion video images as an independent frame to reduce freeze frame time at the user system.

As a second alternative to encoding in a robust format, the video codec may operate during the playback session for: i) receiving the recording sequence of compressed images from the playback module; ii) decoding the recording sequence of compressed images to generate motion video images; and iii) queuing each motion video image for encoding, by the encoding module, as a lost frame correction frame.

In this second alternative, the playback module comprises a delay buffer (24) for delaying the playback sequence of compressed images for a period of time such that each frame within the playback sequence of compressed images is queued for sending to the user system at a time that corresponds to the motion video image queued for encoding as a lost frame correction frame. As such a lost frame correction frame may be substituted for a frame in the playback sequence of compressed images in response to receiving a lost frame message.

As an alternative of having a video codec, the call signaling module may establish each of the first Internet protocol channel and the second internet protocol channel over a TCP/IP connection. As such, the internet protocol services module would operate TCP/IP protocols to effect re-transmission of any lost TCP/IP frames on each of the first TCP/IP connection and the second TCP/IP connection. In this embodiment, the playback sequence of compressed images would be the same as recording sequence of compressed images.

As an alternative to establishing both the first internet protocol channel and the second internet protocol channel over TCP/IP connections, the call signaling module may establish only the first Internet protocol channel over a TCP/IP connection and may establish second Internet protocol channel over a UDP/IP channel.

In this embodiment, the video mail file would comprise the recording sequence of compressed images and a video codec would operate during the playback session using any of the schemes listed above.

As yet another alternative to establishing both the first internet protocol channel and the second internet protocol channel over TCP/IP connections, the call signaling module may establish only the second internet protocol channel over a TCP/IP connection and may establish the first Internet protocol channel over a UDP/IP channel.

In this embodiment, the video mail file would comprise the recording sequence of compressed images and the recording sequence of compressed images would be transferred to the user system as the playback sequence of compressed images for the second internet protocol channel over TCP/IP.

For a better understanding of the present invention, together with other and further aspects thereof, reference is made to the following description in conjunction with the accompanying drawings. The scope of the present invention is set forth in the appended clams.

BRIEF DESCRIPTION OF THE DRAWINGS

FIG. 5c is a diagram representing an exemplary mode of operation of the present invention.

DETAILED DESCRIPTION OF THE EXEMPLARY EMBODIMENTS

Figure 1:
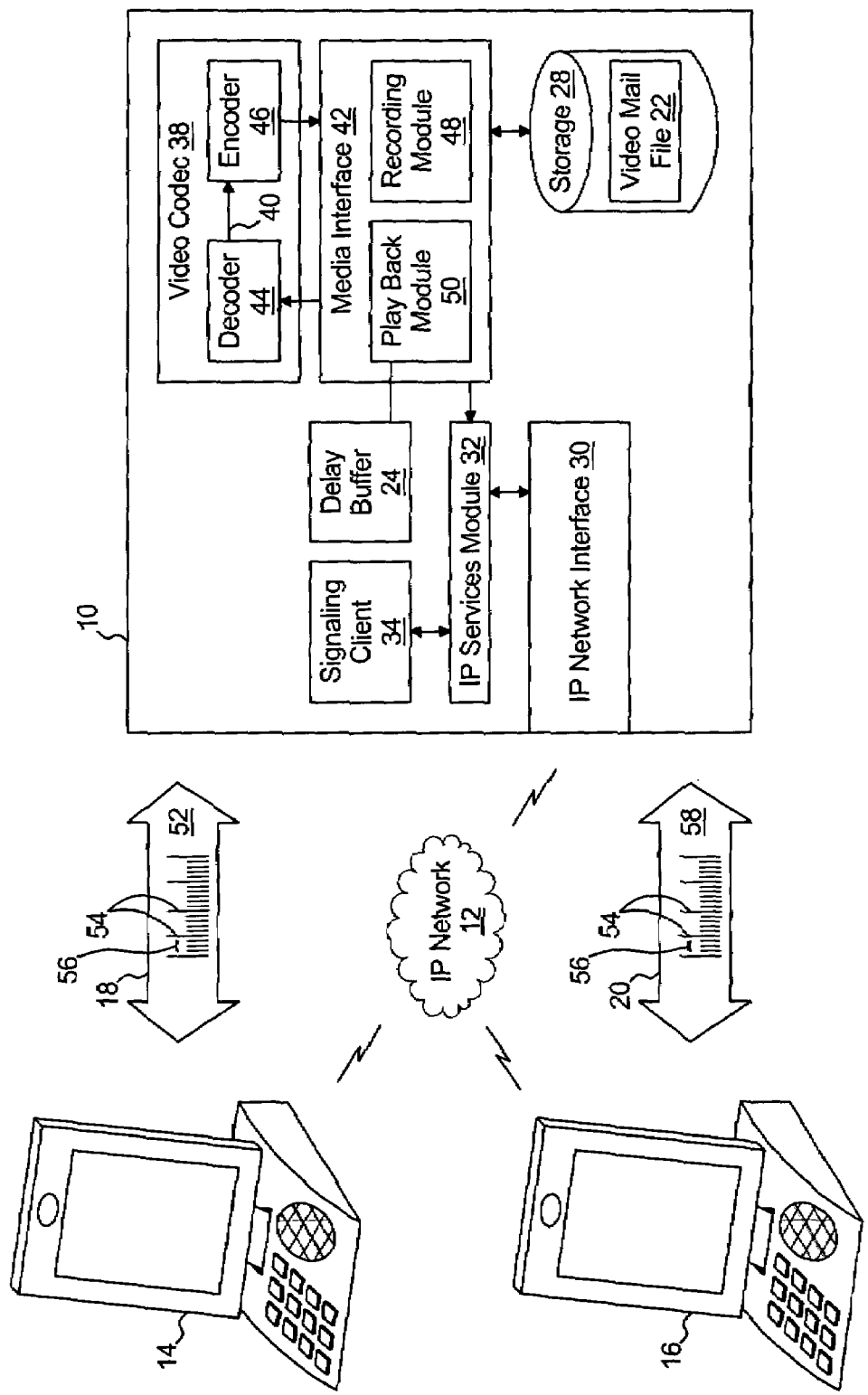
FIG. 1 is a block diagram representing a system for providing VoIP communication services and Internet data connectivity over a frame switched network in accordance with one embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

FIG. 1 represents a video mail server 10 coupled to an internet protocol (IP) network 12 for participating in a video mail recording session with a caller system 14 and participating in play back session with a user system 16.

The video mail server 10 comprises a network interface 30 coupling the server to the IP network 12, an internet protocol services module 32, a signaling client 34, a media interface 42, a delay circuit 24, a video coder/decoder circuit (CODEC) 38, and a data storage 28. Each of these components will be discussed in more detail herein.

The storage 28 may be known combination of magnetic media, reading and writing hardware circuits, and drivers for storing data files. For example, the storage 28 may be a known disk drive system or a combination of disk drive systems.

The network interface 30 may be a known combination of hardware circuits and software drivers for implementing the physical layer and data link layer networking functions of the OSI networking model. In operation, the network interface 30 couples the server 10 to the IP network 12.

The internet protocol (IP) services module 32 couples to the network interface 20 and may be a known combination of software modules for implementing the TCP/IP protocols and the UDP/IP protocols of the network layer and transport layer of the OSI model.

The signaling client 34 couples to the IP services module 32 and may operate a known signaling protocol for signaling and establishing real time video media session with remote signaling clients operating on remote devices. Exemplary signaling protocols include the Session Initiation Protocol (SIP) as promulgated by the Internet Engineering Task Force (IETF), the Multi-Media Gateway Control Protocol (MGCP) also promulgated by the IETF, and the Q.931 and the H.245 protocols of the H.323 protocol promulgated by the International Telecommunication Union. In further discussion of the signaling client 34, the SIP protocols will be used as an example, and such use is not intended to limit the scope of the invention.

The media interface 42 couples to the IP services module 32 and includes a recording module 48 and a play back module 50.

Figure 5A:
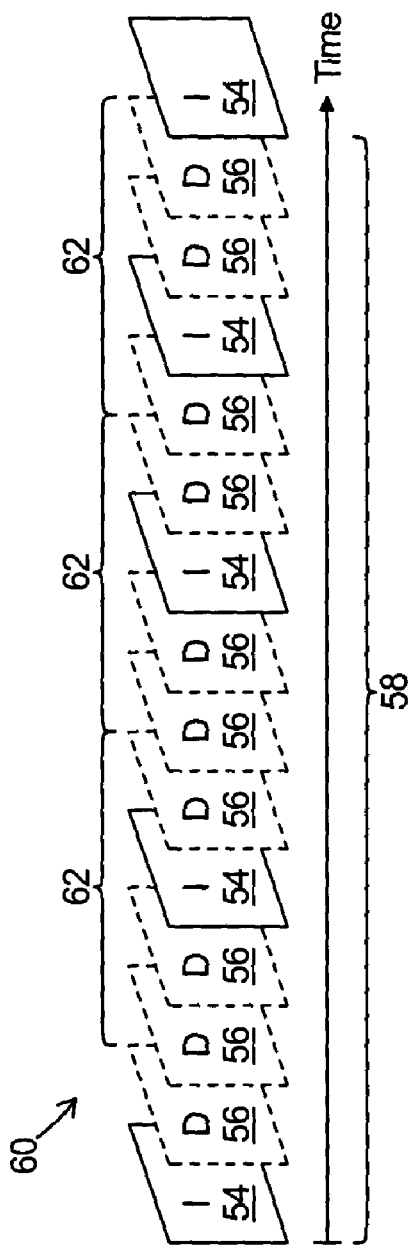
FIG. 5a is a diagram representing a sequence of compressed video frames in accordance with one embodiment of the present invention.
Figure 5B:
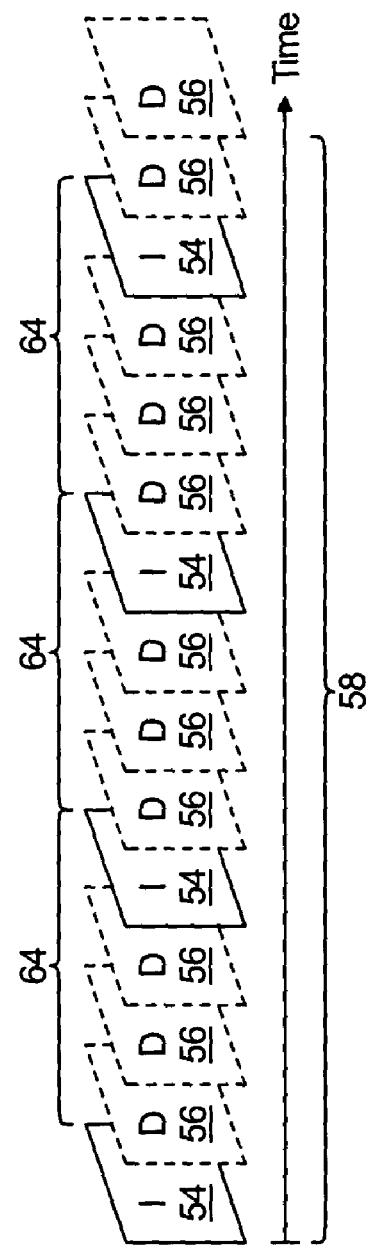
FIG. 5b is a diagram representing a sequence of compressed video frames in accordance with one embodiment of the present invention.
Figure 5D:
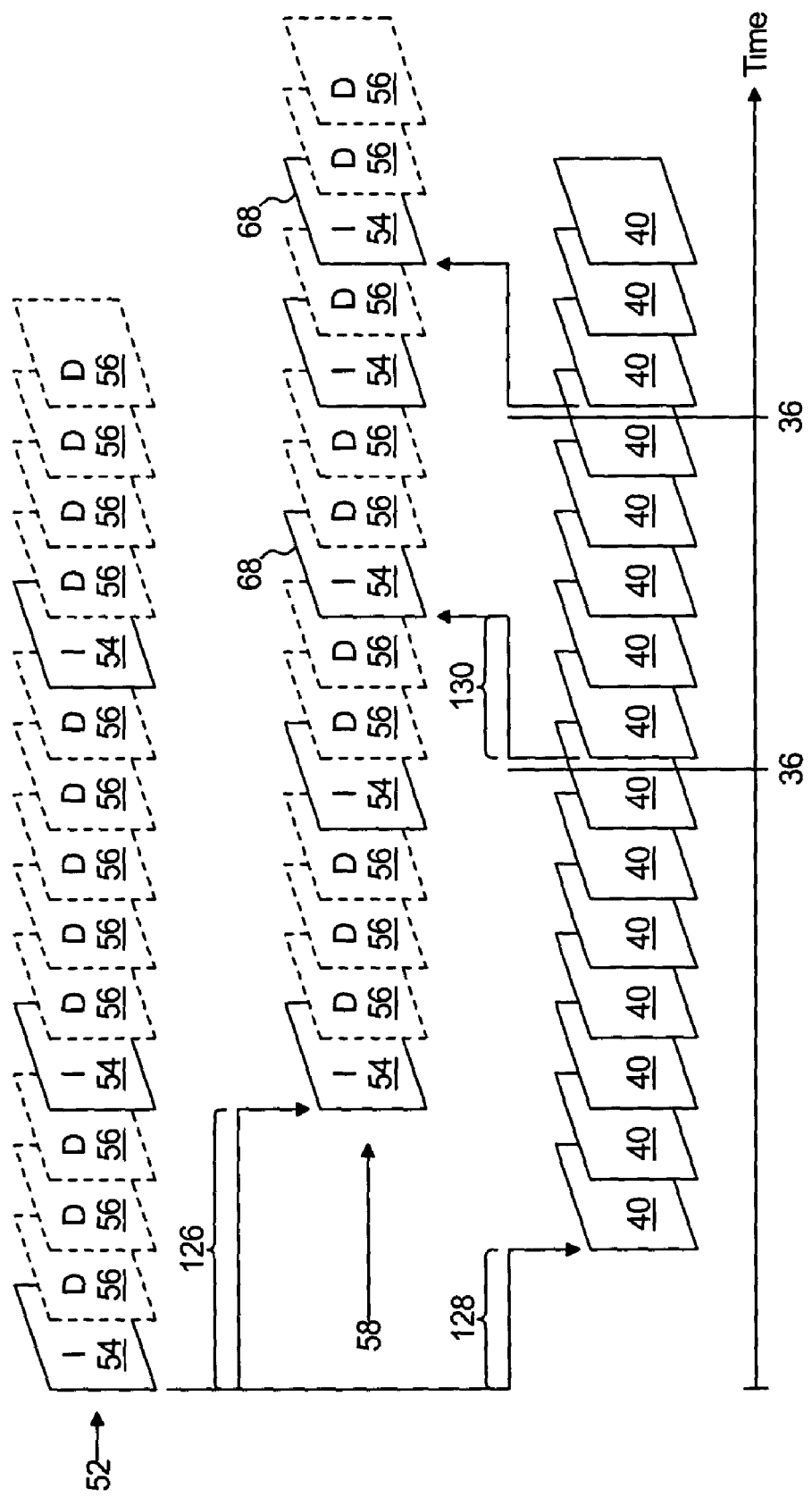
FIG. 5d is a diagram representing an exemplary mode of operation of the present invention.

The delay buffer 24 is coupled to the media interface 42 and may be a known first-in-first-out (FIFO) register or memory circuit for delaying a stream of data by a fixed duration of time 126 (FIG. 5d).

The video codec 38 is coupled to the media interface 42 and may be a known combination of digital signal processing circuits and drivers for converting between a sequence of motion video images and a sequence of compressed images frames representative thereof.

As an overview, the recording module 48 obtains a recording sequence of compressed images 52 representing motion video provided by the caller system 14 over a first internet protocol (IP) channel 18 established by the signaling module 32 (in response to call signaling being provided to the video mail server 10 by the caller system 14). A representation of the recording sequence of compressed images 52 is stored as a video mail file 22 in the storage 28.

The playback module 50 obtains the video mail file 22 and provides a playback sequence of compressed images 58 to the user system 16 over a second IP channel 20 established by the signaling module 32. A more detailed discussion of the media interface 42 is included herein.

Each compressed image within each of the recording sequence of compressed images 52 and the play back sequence of compressed images 58 comprises is one of an independent frame 54 and a dependent frame 56. An independent frame 54 comprises a compressed representation of the complete video image. An independent frame 54 can be decompressed to generate the video image without reference to a preceding frame or a following frame. An exemplary independent frame 54 is the "intra frame" format or "i-frame" as defined in the H.263 standard, entitled "Video Coding for Low Bit Rate Communication", promulgated by the International Telecommunication Union.

A dependent frame 56 comprises data representing the differences between the dependent frame 56 and at least one preceding independent frame 54 or dependent frame 56—and optionally one following independent frame 54 or dependent frame 56. A dependent frame 56 can only be decompressed with reference to the at least one preceding frame or following frame from which the differences deviate. Exemplary dependent frame formats include the "predicted frame" or "p-frame" and the "bi-directional" or "b-frame" each defined in the H.263 standard.

As stated above, a problem with transferring a video image using a compression scheme with interdependent frames is that if a frame is lost during transmission, all subsequent frames that depend thereon are also lost. The image on the receiving IP device will freeze until the next independent frame 54 is received.

Further, because the time period between independent frames 54 varies based on video image content and is not predictable, the length of freeze frame could be quite long. In order to reduce frame loss and thereby reduce the freeze time periods when the motion video is viewed on the user system 16, the server 10 implements one of the following frame loss embodiments.

The first frame loss embodiment includes storing the recording sequence of compressed images 52 representing motion video provided by the caller system 14 in the video mail file 22 in the storage 28. The video mail file 22 will be missing any frames that were lost during the recording session.

During playback, the recording sequence of compressed images 52 is retrieved from the video mail file 22, transferred to the codec 38 for decoding and re-encoding in a robust format. The robust format requires that at least one independent frame be encoded for every fixed period of time. For example, the robust format may require that at least one independent frame be encoded for each one second time period or each half second time period. While any freeze frame caused by loss of framed during the recording session will still remain when viewed on the user system 16, any additional freeze frame caused by frame loss during the play back session will be limited to only one half second.

The second frame loss embodiment is very similar to the first frame loss embodiment, except that the robust format requires a fixed period of time between each independent frame 54. For example, the robust format may require that an independent frame 54 be generated every half second or every second.

The third frame loss embodiment includes storing the recording sequence of compressed images 52 representing motion video provided by the caller system 14 in the video mail file 22 in the storage 28. Again, the video mail file 22 will be missing any frames that were lost during the recording session.

During playback, the recording sequence of compressed images 52 is retrieved from the video mail file 22, transferred to the codec 38 for decoding and re-encoding in a normal format. If, during the playback session, the user system 16 detects any frame loss, the user system 16 will immediately generate a lost frame message to the server 10.

The server 10 interprets the lost frame message as an instruction to encode the next frame as an independent frame 54 and will provide for the codec 38 to encode the next frame as an independent 54. Again, while any freeze frame caused by loss of frames during the recording session will still remain when viewed on the user system 16, any additional freeze frame caused by frame loss during the play back session will be limited to the time duration required between when the user system 16 to detects frame loss and when the independent frame 54 generated by the server is transferred to the user system 16.

The fourth frame loss embodiment includes storing the recording sequence of compressed images 52 representing motion video provided by the caller system 14 in the video mail file 22 in the storage 28. The video mail file 22 will be missing any frames that were lost during the recording session. During playback, the recording sequence of compressed images 52 is retrieved from the video mail file 22 and simultaneously transferred to both the delay circuit 24 and to the codes 38 for decoding.

The delay circuit 24 delays the recording sequence of compressed images 52 for a time duration 126 such that the an image frame output from the decoder 44 corresponds to the compressed frame output from the delay circuit 24. The output of the delay circuit 24 (e.g. the recording sequence of compressed images 52) is transferred to the user system 16 during the playback session. However, if the user system 16 detects any frame loss, the user system 16 will immediately generate a lost frame message to the server 10. The server 10 interprets the lost frame message as an instruction to encode the next frame as an independent frame 54 and provides for the encoder 46 to encode the next frame output by the decoder 44 as an independent frame 65 and provides for the media interface 42 to substitute such independent frame 65 for its corresponding frame from the delay buffer 24. Again, while any freeze frame caused by loss of frames during the recording session will still remain when viewed on the user system 16, any additional freeze frame caused by frame loss during the play back session will be limited to the time duration required between when the user system 16 to detects frame loss and when the independent frame 54 generated by the server is transferred to the user system 16.

The fifth frame loss embodiment includes converting the recording sequence of compressed images 52 to the robust format prior to storage. There exist two systems for implementing this fifth frame loss embodiment. In the first system, the server 10 may periodically generate a lost frame message to the caller system 14. In response, the caller system will generate its next compressed image frame as an independent frame. The server 10 will provide this periodic lost frame message to the caller system 14 regardless of whether any frame really has been lost. The purpose of the request is to assure that the recording sequence of compressed images 52 is in the robust format when received by the server 10.

In the second system, the server 10 may generate the robust format locally. More specifically, the server 10 may transfer the recording sequence of compressed images to the codec 38 for decoding and re-encoding in the robust format and transferred to storage 28 as the video mail file 22. During playback, each compressed frame from the video mail file 22 is transferred to the user system 16.

A first sub embodiment of this fifth embodiment is the robust format wherein at least one independent frame 54 is encoded for each fixed time period. A second sub embodiment of this fifth embodiment is the robust format wherein a fixed time period exists between each independent frame. Again, while any freeze frame caused by loss of frames during the recording session will still remain when viewed on the user system 16, any additional freeze frame caused by frame loss during the play back session will be limited to only the time period between the lost frame and the when next independent frame 54 is received.

A sixth frame loss embodiment includes establishing the first internet protocol channel 18 as a TCP/IP channel such that the IP services module 32 will operate TCP/IP error correction protocols to ensure that there are no lost frames during the recording session. The recording sequence of compressed images 52 is stored as the video mail file 22 in the storage 28. During playback, the recording sequence of compressed images 52 is retrieved from the video mail file 22 and provided to the user system 16 using any of the playback systems of the first through the fourth embodiments discussed above.

A seventh frame loss embodiment includes establishing the second Internet protocol channel 20 as a TCP/IP channel such that the IP services module 32 will operate TCP/IP error correction protocols to ensure that there are no lost frames during the playback session. However, the first internet protocol channel 18 over which the recording sequence of compressed images is transferred remains a UDP/IP channel. The recording sequence of compressed images 52 is stored as the video mail file 22. During playback, the recording sequence of compressed images 52 is retrieved from the video mail file 22 and provided to the user system 16 over the TCP/IP second internet protocol channel 20. Again, while freeze frame caused by loss of frames during the recording session will still remain when viewed on the user system 16, no additional freeze frame will be caused during the play back session because of the error correction protocols of TCP/IP.

An eighth embodiment includes establishing both the first internet protocol channel 18 and the second internet protocol channel 20 as a TCP/IP channels. As such the IP services module 32 will operate TCP/IP error correction on both channels 18 and 20 to ensure that there are no lost frames during either the recording session or the playback session.

Signaling Client.

Figure 2A:
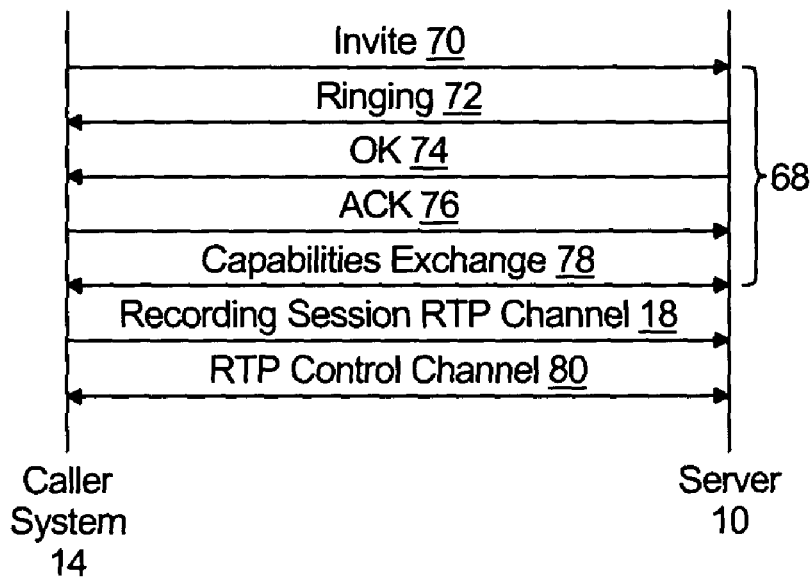
FIG. 2a is a ladder diagram representing set up of a recording session in accordance with one embodiment of the present invention.

The ladder diagram of FIG. 2a represents interaction between the server 10 and the caller system 14. Referring to FIG. 2a in conjunction with FIG. 1, steps 68 represent the signaling module 34 establishing the first internet protocol channel 18 with the caller system 14. As discussed above, the SIP signaling described herein is for purposes of illustration only and is not intended to limit the scope of the invention to only those systems that implement SIP.

Step 70 represents the signaling module 34 receiving an invite message from the caller system 14 (or a proxy representing the caller system 14). Step 72 represents the signaling module 34 returning a ringing message. The purpose of the ringing message 72 is to trigger the caller system 14 to generate ringing tones for the caller during any time period needed before the signaling module is able to provide an OK message at step 74. The OK message is a signal to the caller system 14 that the server 10 can accept the call and is ready to begin the exchange of media capabilities necessary to receive the recording sequence of compressed frames 52 over the first IP channel 18.

Following the OK message, at step 78, the caller system 14 provides an acknowledge message at step 76. The signaling client 32 then exchanges media capabilities and port selection for the first IP channel 18 and for a real time control channel 80. In any of the first through fifth, and the seventh, embodiments discussed above, the first IP channel 18 will be a UDP/IP channel over which the recording sequence of compressed images will be transferred. In the sixth and eighth embodiments, the first IP channel 18 will be a TCP/IP channel.

Figure 2B:
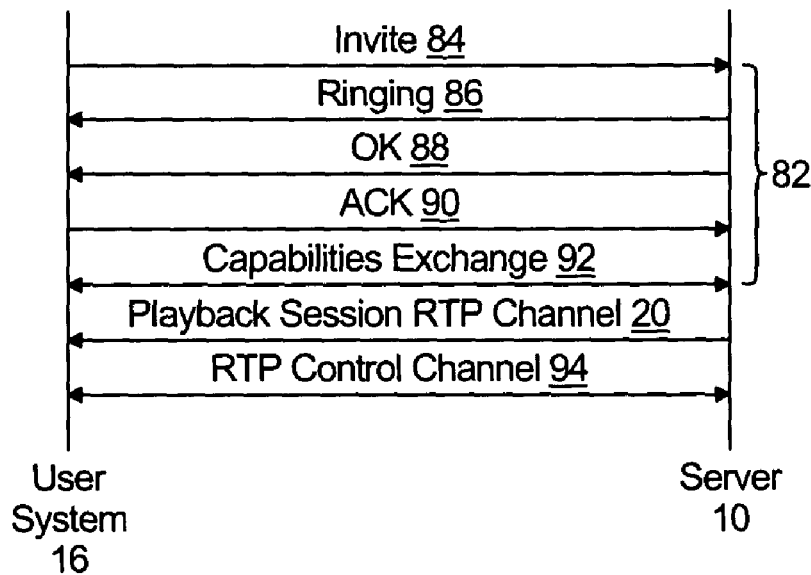
FIG. 2b is a ladder diagram representing set up of a play back session in accordance with one embodiment of the present invention.

The ladder diagram of FIG. 2b represents interaction between the server 10 and the user system 16. Referring to FIG. 2b in conjunction with FIG. 1, steps 82 represent the signaling module 34 establishing the second internet protocol channel 20 with the user system 20.

Step 84 represents the signaling module 34 receiving an invite message from the user system 16 (or a proxy representing the user system 16). Step 86 represents the signaling module 34 returning a ringing message. Step 88 represents sending an OK message to the user system 16 indicating that the server 10 can accept the call and is ready to begin the exchange of media capabilities necessary to transfer the playback recording session sequence of compressed frames 58 over the second IP channel 20.

Following the OK message, at step 88, the user system 16 provides an acknowledge message at step 90. The signaling client 34 then exchanges media capabilities and port selection for the second IP channel 20 and for a real time control channel 94. In any of the first through sixth embodiments discussed above, the second IP channel 20 will be a UDP/IP channel over which the recording sequence of compressed images will be transferred. In the seventh and eighth embodiments, the second IP channel 20 will be a TCP/IP channel.

Media Interface

Figure 3B:
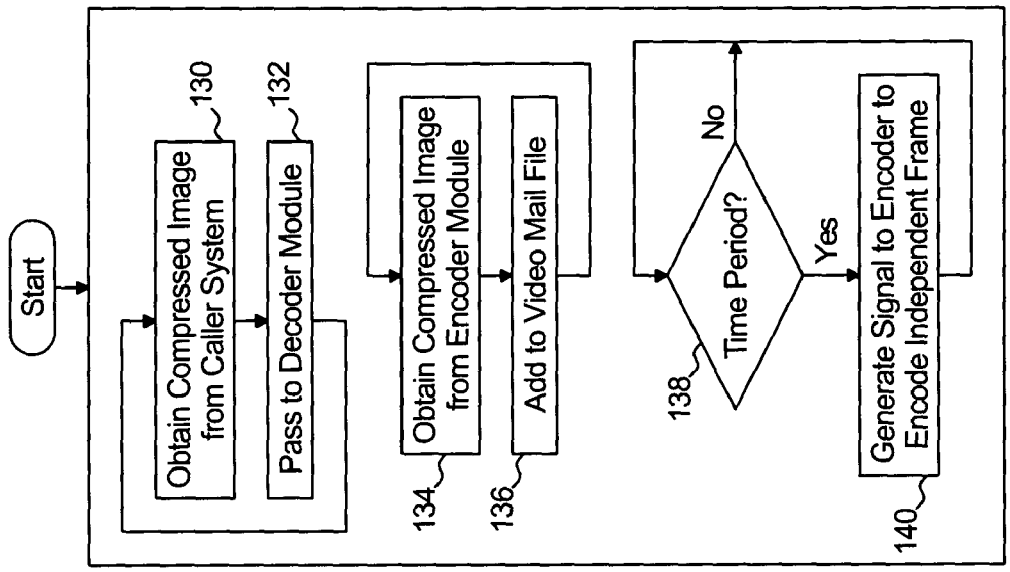
FIG. 3b is a flow chart representing one embodiment of operation of a recording module of the present invention.
Figure 3A:
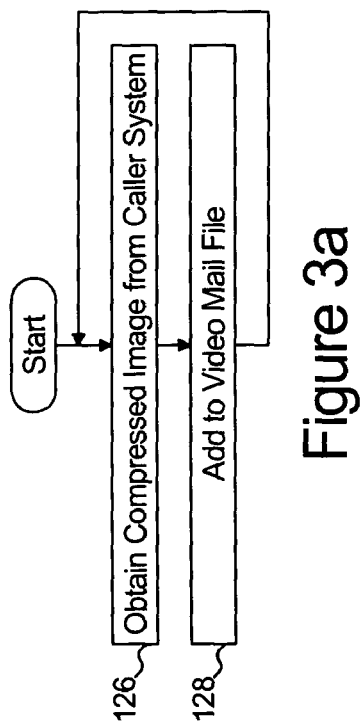
FIG. 3a is a flow chart representing one embodiment of operation of a recording module of the present invention.
Figure 4A:
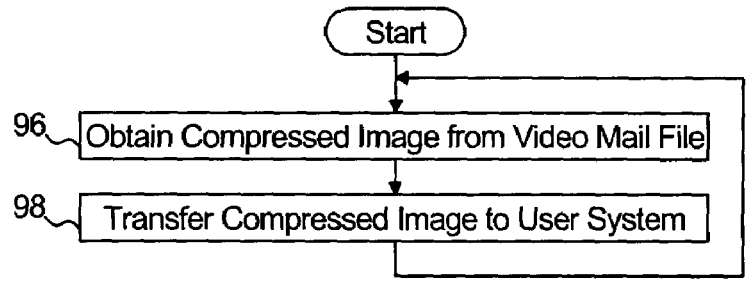
FIG. 4a is a flow chart representing one embodiment of operation of a playback module of the present invention.
Figure 4B:
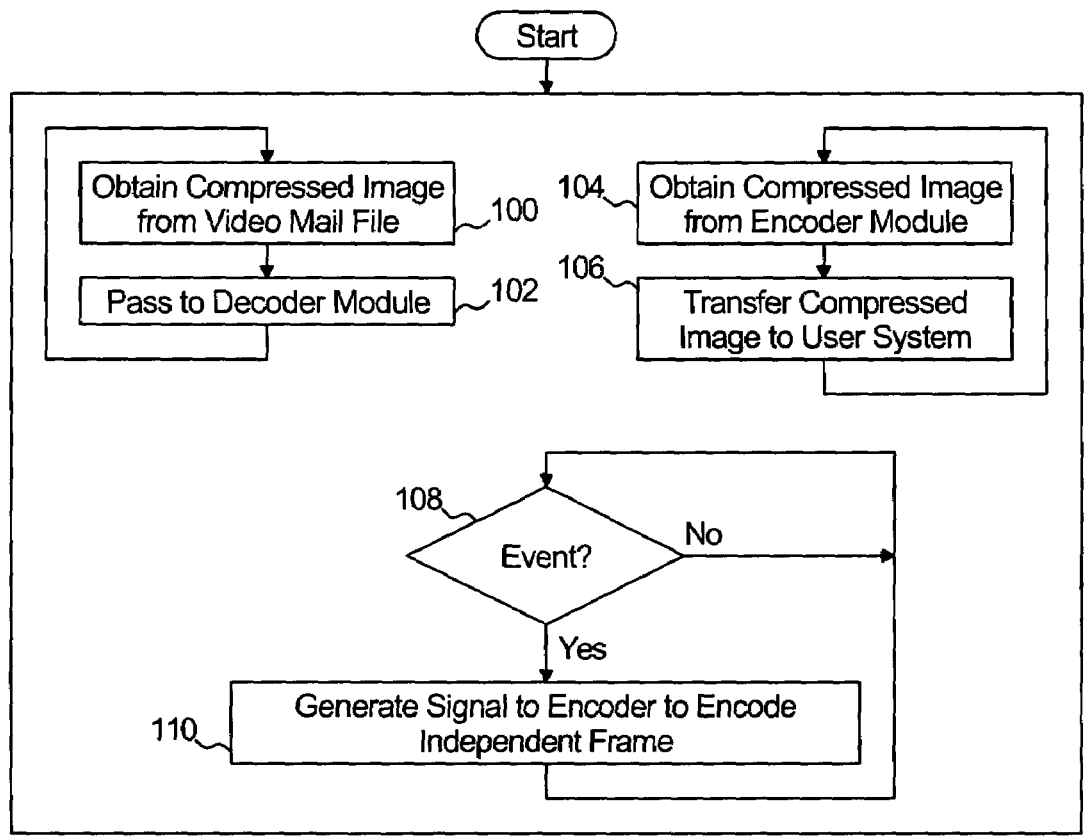
FIG. 4b is a flow chart representing one embodiment of operation of a playback module of the present invention.

The first embodiment of operation of the media interface is illustrated with referring to the flow chart of FIG. 3a, the flowchart of FIG. 4b, and the frame diagram of FIG. 5a in conjunction with FIG. 1. The flow chart of FIG. 5a represents operation of the recording module 48 of the media interface 42. The flowchart of FIG. 4b represents operation of the playback module 50 of the media interface 42, and the frame diagram 5a represents the play back sequence of image frames 58.

With reference to FIG. 3a and FIG. 1, the recording module receives each frame 54 and 56 of the recording sequence of compressed image frames 58 from the caller system 14 over the first IP channel 18, as is represented by step 126, and stores each received frame 54 and 56 as the video mail file 22 in the storage. The endless loop between steps 126 and 128 represents receipt and storage of each frame 54 and 46 in the sequence.

With reference to FIG. 4b and FIG. 1, the playback module simultaneously operates three processes. The first process includes obtaining the recording sequence of compressed image frames 52 (as stored by the recording module 48) from the video mail file 22 and transferring each compressed image (in sequence) to the decoder module 44 as is represented by steps 100 and 102.

The decoder 44 receives the compressed image sequence and decodes to generate motion video images 40 which are immediately passed to the encoder 46. The encoder 46 generates the play back sequence of compressed image frames 58 as is shown in FIG. 5a.

The second process includes obtaining the playback sequence of compressed image frames 58 from the encoding module 46 and transferring the playback sequence of compressed images frames 58 to the user system 16 over the second IP channel 20 as is represented by steps 104 and 106.

The third process includes determining whether an event has occurred at steps 108 and, if so, generating a signal to the encoder module 46 to generate the next frame in the playback sequence of compressed image frames 58 as an independent frame 54.

In the first embodiment, the event that would trigger such a signal would be an elapse of time during which an independent format frame 54 has not been received from the decoder module 46.

Referring to FIG. 6a, the resultant playback sequence of compressed image frames 58 includes at least one independent frame for each fixed time duration 62.

The second embodiment of operation of the media interface is illustrated with referring to the flow chart of FIG. 3a, the flowchart of FIG. 4b, and the frame diagram of FIG. 5b in conjunction with FIG. 1. Similar to the first embodiment, the flow chart of FIG. 3a represents operation of the recording module 48 and the flowchart of FIG. 4b represents operation of the playback module 50. FIG. 5b represents the play back sequence of image frames 58.

The difference between the first embodiment and the second embodiment is that in the process of determining whether an event that would trigger a signal to generate an independent frame is not an elapse of time during which an independent frame has not been received, but an elapse of a time period 64 since the last signal to generate an independent frame was provided to the encoding module 46.

Referring to FIG. 5b, the resultant playback sequence of compressed image frames 58 includes an independent frame 54 with a fixed time period 64 there between.

The third embodiment of operation of the media interface is illustrated with referring to the flow chart of FIG. 3a, the flowchart of FIG. 4b, and the frame diagram of FIG. 5c in conjunction with FIG. 1. Similar to the first and second embodiments, the flow chart of FIG. 3a represents operation of the recording module 48 and the flowchart of FIG. 4b represents operation of the playback module 50. FIG. 5c represents the sequence of frames during playback.

With reference to FIGS. 4b and 5c, the playback module simultaneously operates three processes. As discussed above, the first process (steps 100 and 102) includes obtaining the recording sequence of compressed image frames 52 (as stored by the recording module 48) from the video mail file 22 and transferring each compressed image (in sequence) to the decoder module 44.

The decoder 44 receives the compressed image sequence and decodes to generate motion video frames 40 which are immediately passed the encoder 46. Because of the time delay for decoding, FIG. 5c shows the motion video frames 40 delayed from the recording sequence of compressed image frames 52.

The encoder module generates the play back sequence of compressed image frames 58. Because of the time delay for encoding, FIG. 5c shows the play back sequence of compressed image frames 58 delayed from the motion video frames 40 and further delayed from the recording sequence of compressed image frames 52.

The second process (steps 104 and 106) includes obtaining the playback sequence of compressed image frames 58 from the encoding module 46 and transferring the playback sequence of compressed images frames 58 to the user system 16 over the second IP channel 20 as is represented by steps 104 and 106.

The third process includes determining whether an event has occurred at step 108 and, if so, generating a signal to the encoder module 46 to generate the next frame in the playback sequence of compressed image frames 58 as an independent format frame 54. In this third embodiment, the event that would trigger such a signal would be receipt of a lost frame message 36 from the user system 16 indicating that a frame loss has occurred. As such, the resultant playback sequence of compressed image frames 58 includes an independent frame 54 following each lost frame message 36.

Figure 4C:
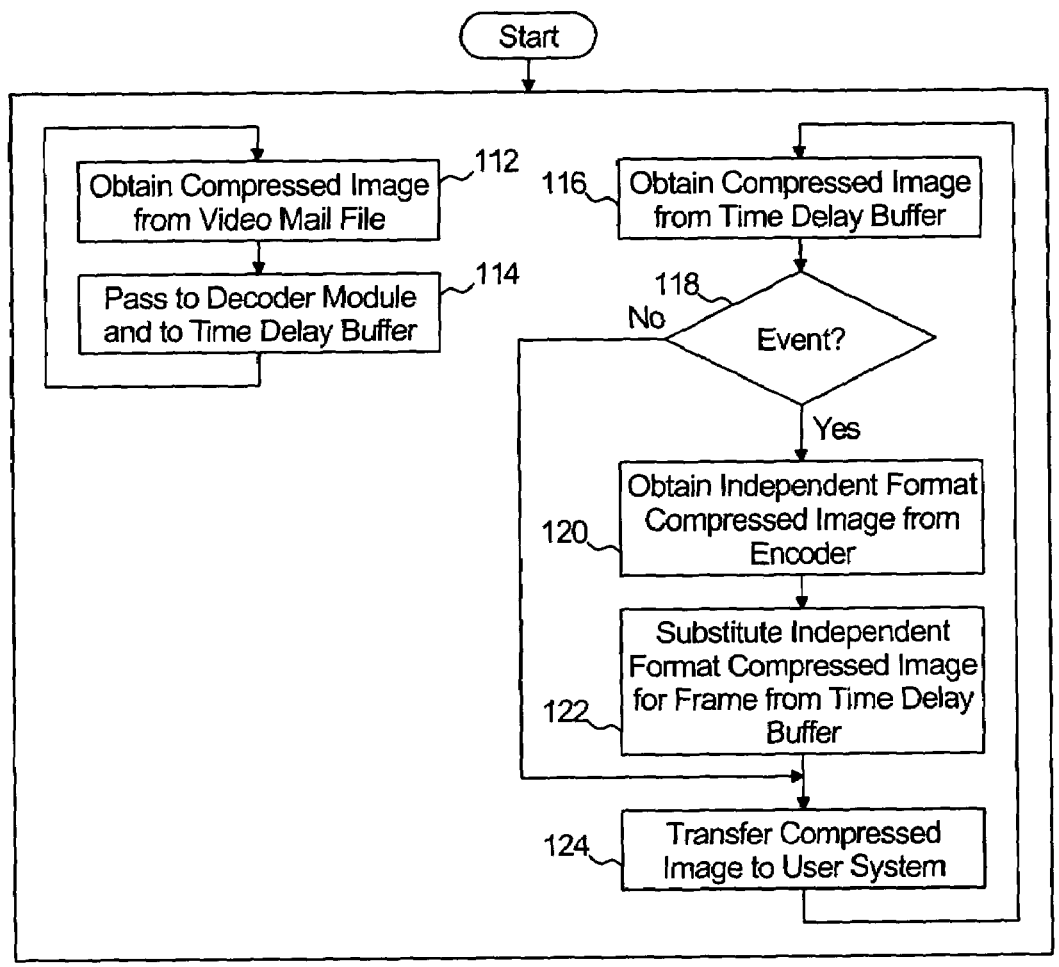
FIG. 4c is a flow chart representing one embodiment of operation of a playback module of the present invention.

The fourth embodiment of operation of the media interface is illustrated with reference to the flow chart of FIG. 3a, the flowchart of FIG. 4c, and the frame diagram of FIG. 5d in conjunction with FIG. 1. Similar to the previously discussed embodiments, the flow chart of FIG. 3a represents operation of the recording module 48 and the flowchart of FIG. 4c represents operation of the playback module 50. FIG. 5d represents the sequence of frames during playback.

With reference to FIG. 4c and 5b, the playback module simultaneously operates two processes. The first process (steps 112 and 114) includes obtaining the recording sequence of compressed image frames 52 (as stored by the recording module 48) from the video mail file 22 and transferring each compressed image (in sequence) to both the decoder module 44 and to the delay buffer 24.

The decoder module 44 receives the compressed image sequence and decodes each frame to generate motion video frames 40. Because of the time delay for decoding, FIG. 5d shows the motion video frames 40 delayed from the recording sequence of compressed image frames 52 by a time period 128.

The delay buffer 24 delays the playback sequence of compressed image frames 52 by a time period 126 that corresponds to the period of time 128 required to generate the motion video frames 40 plus a period of time 130 required to re-encode a motion video 40 to generate an independent frame 54.

In the second process, the playback module 50 sequentially retrieves each compressed image from the delay buffer 24 at step 116. Step 118 represents determining whether a lost frame message 36 has been received from the user system 16. If a lost frame message 36 has not been received, the compressed image frame is transferred to the user system 16 over the second IP channel 20 at step 124.

Alternatively, if a lost frame message 36 has been received, an instruction is passed to the encoder 46 to generate an independent frame 54. Step 120 represents obtaining the independent frame 54 from the encoder 46 as a lost frame correction frame 68. Step 122 represents substituting the lost frame correction frame 68 for a frame in the sequence of frames received from the delay buffer 24. The substituted frame is then provided to the user system 16 at step 124. Again, the endless loop represents such processing of each frame in the sequence.

The resultant playback sequence of compressed image frames 58 includes an independent frame 54 following each lost frame message 36.

The fifth embodiment of operation of the media interface is illustrated with referring to the flow chart of FIG. 3b, the flowchart of FIG. 4a, and the frame diagram of FIG. 6a in conjunction with FIG. 1. The flow chart of FIG. 3b represents operation of the recording module 48 of the media interface 42. The flowchart of FIG. 4a represents operation of the playback module 50 of the media interface 42, and the frame diagram 5a represents the play back sequence of image frames 58.

With reference to FIG. 3b, the recording module simultaneously operates three processes. The first process includes obtaining a each frame of the recording sequence of compressed image frames 52 over the first IP channel 18 and passing the frame to the decoder module 44 at steps 130 and 132 respectively. Again, the endless loop represents repeating this process for each frame in the sequence of compressed image frames 52.

The decoder 44 receives and decodes each compressed image frame and generates motion video frames 40 which are immediately passed to the encoder 46.

The encoder 46 encodes each video image frame 40 to generate the play back sequence of compressed image frames 58 as is shown in FIG. 5a.

The second process includes obtaining each compressed frame of the playback sequence of compressed image frames 58 from the encoder 46 and transferring the compressed frame to the video mail file 22 at steps 134 and 136 respectively. Again, the endless loop represents repeating this process for each frame of the playback sequence of compressed images frames 58.

The third process includes determining whether an event has occurred at step 138 and, if so, generating a signal to the encoder module 46 to generate the next frame in the playback sequence of compressed image frame 58 as an independent format frame 54. In this fifth embodiment, the event that would trigger such a signal would be an elapse of time during which an independent format frame 54 has not been received from the decoder module 46.

With reference to FIG. 4a, the play back module simply obtains the sequence of compressed images from the video mail file 22 at step 96 and transfers such sequence to the user system 16 as the playback sequence of compressed images 58 at step 98.

Referring to FIG. 5a, the resultant playback sequence of compressed image frames 58 includes at least one independent frame for each fixed time duration 62.

The sixth embodiment of operation of the media interface is illustrated with reference to the flow chart of FIG. 5b, the flowchart of FIG. 4a, and the frame diagram of FIG. 5b in conjunction with FIG. 1. Similar to the fifth embodiment, the flow chart of FIG. 3b represents operation of the recording module 48 and the flowchart of FIG. 4a represents operation of the playback module 50. FIG. 5b represents the play back sequence of image frames 58.

The difference between the sixth embodiment and the fifth embodiment is that in the process of determining whether an event that would trigger a signal to generate an independent frame is not an elapse of time during which an independent frame has not been received, but an elapse of a time period 64 since the last signal to generate an independent frame was provided to the encoding module 46.

Figure 3C:
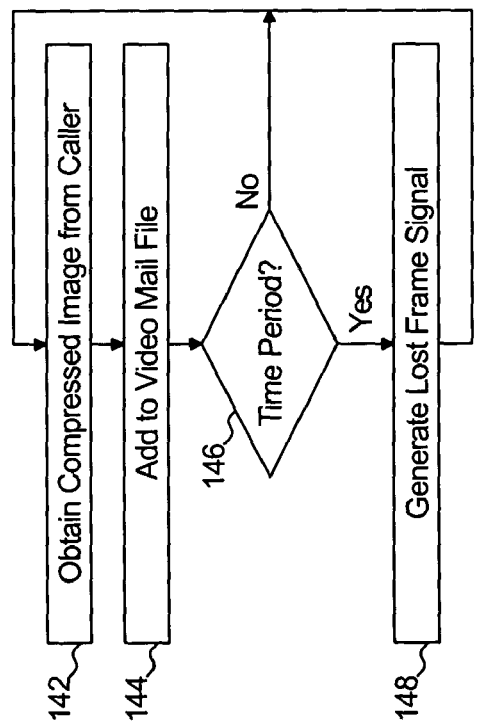
FIG. 3c is a flow chart representing one embodiment of operation of a recording module of the present invention.

The seventh embodiment of operation of the media interface is illustrated with referring to the flow chart of FIG. 3c, the flowchart of FIG. 4a, and the frame diagram of FIG. 5b in conjunction with FIG. 1. The flow chart of FIG. 3c represents operation of the recording module 48 of the media interface 42. The flowchart of FIG. 4a represents operation of the playback module 50 of the media interface 42, and the frame diagram 5b represents the play back sequence of image frames 58.

With reference to FIG. 3S, the recording module receives each frame 54 and 56 of the recording sequence of compressed image frames 58 from the caller system 14 over the first IP channel 18, as is represented by step 1142, and stores each received frame 54 and 56 as the video mail file 22 in the storage at step 144. At step 146, the recording module determines whether a time period—on the order of one second—has elapsed. If the time period has not elapsed, the endless loop between back to step 142 represents receipt and storage of each frame 54 and 46 in the sequence.

After the time period has elapsed at step 146, the recording module generates a lost frame message to the caller system 14. In response to lost frame message, the caller system 14 will encode the next frame in an independent format.

As such, the recording sequence of compressed images 52, as received by the recording module will be in the robust format of FIG. 5b and the playback module may utilize the process describe with respect to FIG. 4a for presenting the play back sequence of compressed images 58 to the user system 16.

The eighth embodiment of operation of the media interface (which corresponds to the sixth frame loss embodiment of the present invention) is illustrated with reference to the flow chart of FIG. 3a and the flow chart of FIG. 4a. Because both the first internet channel 18 and the second Internet channel 20 are established over TCP/IP connections, no schemes for increasing the number of independent frames 54 within the play sequence of compressed images 58 are needed.

In an ninth embodiment of operation of the media interface (which corresponds to the seventh frame loss embodiment of the present invention), includes operation of each of the first through fourth embodiments of operation of the media interface 42.

SUMMARY

It should be appreciated that the systems and methods discussed herein provide for video mail server to provide video mail to a user device with reduced frame loss and therefore reduced freeze time.

Although the invention has been shown and described with respect to certain exemplary embodiments, it is obvious that equivalents and modifications will occur to others skilled in the art upon the reading and understanding of the specification. For example, the exemplary embodiments discussed herein operate utilizing compression techniques of the H.263 protocol. It is readily apparent to those skilled in the art that the teachings of the present invention may also be implemented on other compression protocols that utilize interdependent frame compression techniques. The present invention includes all such equivalents and modifications, and is limited only by the scope of the following claims.

What is claimed is:

1. A video mail server comprising:
 a video call signaling module coupled to an internet protocol network via an internet protocol services module for:
  establishing a first internet protocol channel with a caller remote internet video device to support a recording session over the internet protocol network; and
  establishing a second internet protocol channel with a user remote internet video device to support a playback session over the internet protocol network;
 a media interface coupled to the internet protocol network via the internet protocol services module and comprising:
  a recording module for obtaining a recording sequence of compressed images representing motion video from the caller remote internet video device and storing a video mail file representing the recording sequence of compressed images in a storage; each compressed image frame within the video mail file being one of:
an independent frame from which a video image frame can be recovered utilizing only the independent frame; and
a dependent frame from which the video image frame can only be recovered utilizing both the dependent frame and an independent frame preceding the dependent frame in the sequence;
a play back module for;
retrieving the recording sequence of compressed images from storage and transferring such recording sequence of compressed images as a playback sequence of compressed images to the user remote internet video device;
receiving a lost frame message from the user remote internet, video device when the user remote internet video device detects loss of a frame within the playback sequence of compressed images; and
substituting an independent frame from a video codec encoder module into the playback sequence of compressed images in response to receiving such lost frame message;
a video codec comprising a decoder module and an encoder module;
the decoder module i) receiving the recording sequence of compressed images from the storage; and ii) decoding the recording sequence of compressed images to generate motion video images;
the encoder module encodes a motion video image, as a lost frame correction frame; and
a delay buffer for delaying the playback sequence of compressed images for a period of time such that each frame within the playback sequence of compressed images is queued for transfer to the user remote Internet device at a time when a corresponding independent frame is available from the encoder module for substitution in the playback sequence of compressed images.

2. A method of recording and playing back video mail, the method comprising:
establishing a first internet protocol channel with a caller remote Internet video device to support a recording session over the internet protocol network;
establishing a second internet protocol channel with a user remote Internet video device to support a playback session over the internet protocol network;
obtaining a recording sequence of compressed images from the caller remote internet video device;
storing a video mail file representing the recording sequence of compressed images in a storage; each compressed image frame within the video mail file being one of:
an independent frame from which an image frame can be recovered utilizing only the independent frame; and
a dependent frame from which the image frame can only be recovered utilizing both the dependent frame and an independent frame preceding the dependent frame in the sequence;
retrieving the recording sequence of compressed images from storage and transferring such recording sequence of compressed images as a playback sequence of compressed images to the user remote internet video device;
simultaneously decoding the recording sequence of compressed images to generate motion video images and encoding each motion video image as a lost frame correction frame;
receiving a lost frame message from the user remote internet video device when the user remote internet video device detects loss of a frame within the playback sequence of compressed images; and
substituting an independent frame from a video codec encoder module into the playback sequence of compressed images in response to receiving such lost frame message; and
wherein the playback sequence of compressed images is delayed for a period of time such that each frame within the playback sequence of compressed images is queued for transfer to the user remote internet device at a time when a corresponding independent frame is available for substitution in the playback sequence of compressed, images.

* * * * *